G. R. LONG.
SPOT LIGHT.
APPLICATION FILED JAN. 11, 1917.

1,236,456.

Patented Aug. 14, 1917.
2 SHEETS—SHEET 1.

Inventor
George R. Long
By Attorneys.
Southgate & Southgate

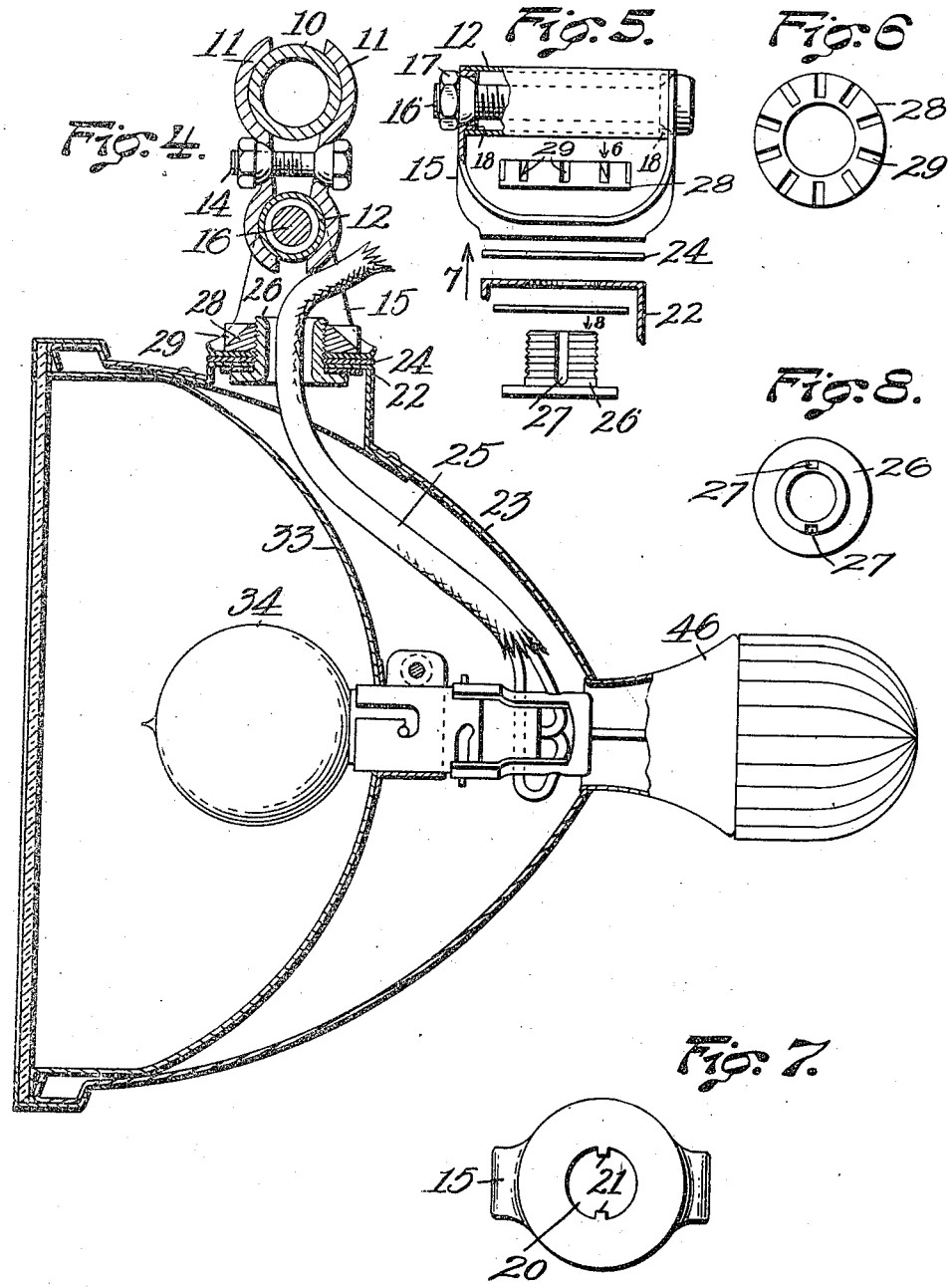

UNITED STATES PATENT OFFICE.

GEORGE R. LONG, OF WATERBURY, CONNECTICUT.

SPOT-LIGHT.

1,236,456.  Specification of Letters Patent.  Patented Aug. 14, 1917.

Application filed January 11, 1917. Serial No. 141,879.

*To all whom it may concern:*

Be it known that I, GEORGE R. LONG, a citizen of the United States, residing at Waterbury, in the county of New Haven and State of Connecticut, have invented a new and useful Spot-Light, of which the following is a specification.

The principal objects of this invention are to provide an improved means for supporting a spot-light in such a manner that it can be turned either on a horizontal or vertical axis very readily and without making adjustments; means whereby it will stay in any position in which it is turned; and convenient means for adjusting the friction so as to control its location.

Reference is to be had to the accompanying drawings forming part of this application, in which—

Fig. 4 is a central sectional view on still further enlarged scale showing the parts in the position shown in full lines in Fig. 2;

Fig. 5 is an elevation of the several parts used in clamping the lamp to a swinging bracket, these parts being shown separated;

Fig. 6 is an elevation of the adjusting nut looking in the direction of the arrow 6 in Fig. 5;

Fig. 7 is a bottom plan of the outside of the bracket as indicated by the arrows 7 in Fig. 5, and Fig. 8 is an end elevation of the adjusting nut on the other end of these parts, looking in the direction of the arrow 8 in Fig. 5.

Figure 1:
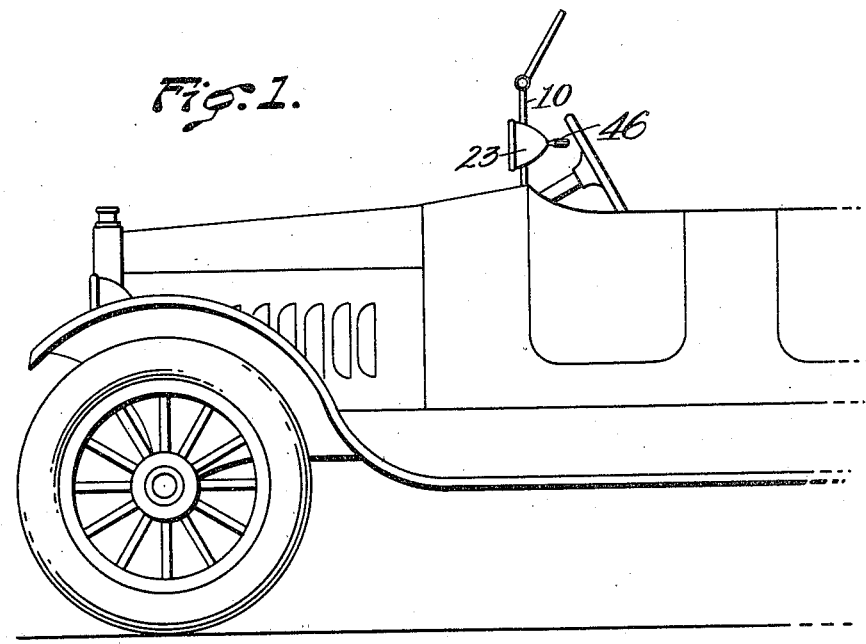
Figure 1 is a side view of an automobile showing the location of the spot-light thereon.

The invention is shown as made in such a form as to be especially adapted to be supported on one of the vertical rods 10 which support the wind-shield. For supporting it a pair of clamps 11 are used, these clamps being shown exactly alike and stamped out of sheet metal. They are provided with curved jaws on both ends for embracing the rod 10 and a hollow separating and supporting cylinder 12 constituting part of the supporting mechanism. The jaws on one end are separated by slits 13 and the two clamps are held together by screws 14 or the like, passing between the rod 10 and the cylinder 12. This firmly holds this cylinder 12 in position on the rod 10 and keeps it in place absolutely.

This cylinder holds a bracket member 15 of U-shape form constructed of sheet metal. The two parallel legs of this bracket member engage opposite ends of the cylinder and are held adjustably with respect to the cylinder by means of a bolt 16 passing freely through the cylinder and having a conical neck under the head and a conical nut 17 for frictionally clamping the parts together. The legs of the U-shaped bracket member are inturned at 18 around the interior of the hole that passes through the cylinder to keep the parts centered. By tightening up on this nut the amount of friction can be varied. This adjustment is one that is desirable because the whole lamp turns about this cylinder as a center as indicated in dotted lines in Fig. 2. The friction is kept high enough so that the lamp will stay in any position in which it is adjusted.

This bracket member 15 has a flat wall through which there is an opening 20. This opening is of a general circular form, but is provided with inwardly extending projections 21 which make it non-circular at those points. It is intended to fit against the flat face of a hub 22 on the spot-light casing 23, being separated therefrom by a washer 24. These latter parts have circular passages through them of substantially the same size as the opening 20 and are intended for the passages of the cable or wire 25. In order that the lamp casing 23 may turn about these members 15, 22 and 24 as a center, that is, turn on a horizontal axis and remain in any adjusted position, the parts are connected with each other in the following way.

On the inside of the lamp there is a screw or nut member 26 having a circular flange on its inner end and perforated centrally to receive the cable. It has an external screw thread on its cylindrical portion and two longitudinal notches 27 placed so as to register with the projections 21, so that when the parts are assembled the bushing 26 and the bracket member 15 turn together. For securing these parts in position with the necessary amount of friction a nut 28 is provided on the outer side screwing on to the screw threaded portion of the bushing 26. This is provided on its edge with a series of slots 29 by which it can be turned to increase or reduce the friction. These slots are made in this form so that the turning can be done by the edge of a coin or the like without the use of any special tool. It will be understood that all these members have central passages as indicated so that the cable will come out between this fastening device and the cylinder 12. This constitutes a means whereby the lamp can be turned about the axis of the cylinder 12 or about the axis of the bushing 26. Thus it can be turned readily about either a vertical or horizontal axis, and on account of the frictional connections of the parts will retain any position to which it is turned.

This lamp casing is shown as is usual in this class of lamps as consisting of an outer casing 23 and reflector 33, between which the supporting member for the lamp 34 is carried.

Figure 2:
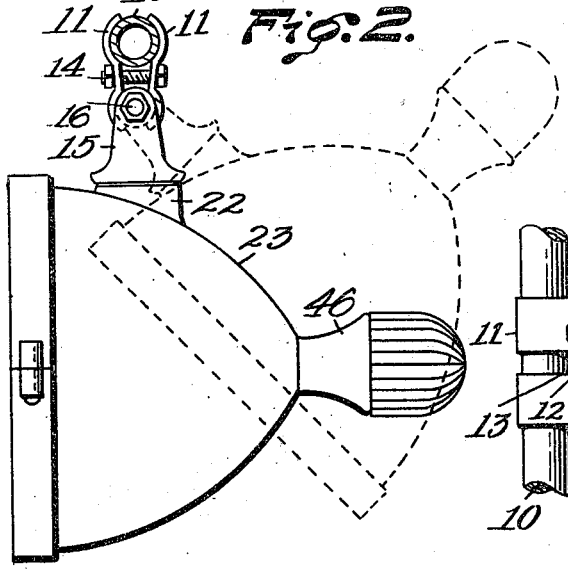
Fig. 2 is a plan of the spot-light on enlarged scale showing the rod on which it is supported in section.
Figure 3:
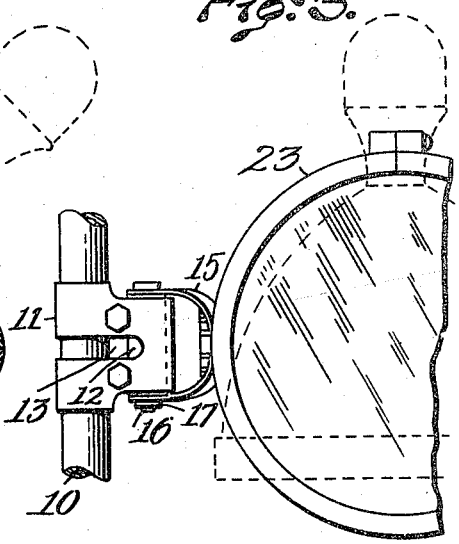
Fig. 3 is a front elevation of the same showing another position of the lamp in dotted lines.

It will be seen that the lamp can be turned into the full and dotted line positions shown in Figs. 2 and 3 or in fact into any position about the axes on which it is adapted to turn. In this way the support for the lamp is firm and secure and yet easily adjusted.

Although I have illustrated and described only a single form of the invention I am aware of the fact that modifications can be made therein by any person skilled in the art without departing from the scope of the invention as expressed in the claims. Therefore, I do not wish to be limited to all the details of construction herein shown and described, but what I do claim is:—

1. The combination with a supporting rod and a spot-light, of a hollow cylinder adjacent to the rod and parallel therewith, a pair of clamps engaging opposite sides of the cylinder for clamping the cylinder to the rod positively, a member passing through the cylinder, and frictional means for connecting both ends of said member with the spot-light so as to permit the adjustment of the light about the cylinder simply by turning the light, said frictional means being adapted to hold the light in any adjusted position.

2. The combination with a spot-light, of a hollow separating cylinder, a bolt passing through the cylinder, a bracket member engaging the ends of said cylinder, the bolt also passing through the ends of the bracket member, a conical nut on said bolt for frictionally securing the bracket member to the cylinder whereby the bracket member can be adjusted about the cylinder, and means for connecting the bracket member with the spot-light.

3. The combination with a spot-light, of a pair of clamps having opposite jaws, means for securing said jaws together, a hollow separating cylinder secured by the jaws on one side of said clamps whereby said cylinder can be secured to a support by the clamps, a bolt passing through the cylinder, a bracket member engaging the ends of said cylinder, the bolt also passing through the ends of the bracket member, a conical head and nut on said bolt for frictionally securing the bracket member to the cylinder whereby the bracket member can be adjusted about the cylinder, and means for adjustably connecting the bracket member with the spot-light.

4. In a device of the character described, the combination of a bracket member, a spot-light rotatably connected with said bracket member to swing about a horizontal axis, means for holding the spot-light by friction in any adjusted position, said bracket member having two perforated arms extending away from the spot-light in parallel planes, a separating member between said arms having a passage therethrough, a bolt extending through the perforations in the arms and through the separating member, and having opposite cones for frictionally securing the arms to the ends of the separating member, whereby the spot-light can be turned about the bolt as a center and will be held in any adjusted position, and a handle projecting axially from the rear of the spot-light for turning it about both axes.

5. In a device of the character described, the combination of a bracket member, having two perforated arms in parallel planes, a separating member between said arms having a passage therethrough, means for supporting said separating member in fixed position, a bolt extending through the perforations in the arms and through the separating member, and having means for frictionally securing the arms to the ends of the separating member, whereby the bracket member can be turned about the bolt as a center and will be held in any adjusted position, a spot-light having a handle projecting axially from the rear thereof for manipulating it, a threaded bushing projecting through the wall of the lamp and through the supporting bracket, said wall and bushing having means for preventing the bushing from turning with respect to the bracket member after being placed in position, and a nut on the inside of the bracket member for securing the bracket member on the lamp, said nut being secured on the bushing.

6. In a device of the character described, the combination of a bracket member, means for frictionally securing said bracket member in any adjusted position, said bracket member having a flat face provided with a non-circular perforation, a spot-light having a cylindrical projection thereon having a flat face centrally perforated, a bushing inside said projection having an end flange therein and a central passage therethrough for a wire cable, and provided with a screw-threaded portion extending through said perforations in the projection and bracket member, and having means for engaging the non-circular part of the bracket member so as to turn with it always, and a nut on the outer wall of the bracket member engaging the end of said bushing for securing the spot-light to the bracket member frictionally.

7. In a device of the character described, the combination of a bracket member having a flat face provided with a non-circular perforation, a spot-light having a flat face centrally perforated, a bushing having an end flange and a central passage therethrough for a wire cable, and provided with a screw-threaded portion extending through said perforations, and having means for engaging the non-circular part of the bushing member so as to turn with it always, and a nut on the outer wall of the bracket member engaging the end of said bushing for securing the spot-light to the bracket member frictionally.

In testimony whereof I have hereunto affixed my signature.

GEORGE R. LONG.